United States Patent [19]

Hucks, Jr.

[11] Patent Number: 4,840,252
[45] Date of Patent: Jun. 20, 1989

[54] DEER STAND

[76] Inventor: Lacy K. Hucks, Jr., 229 S. Waccamaw Dr., Garden City, S.C. 29576

[21] Appl. No.: 138,806

[22] Filed: Dec. 28, 1987

[51] Int. Cl.[4] .............................................. E04G 3/00
[52] U.S. Cl. ......................................... 182/187; 43/1
[58] Field of Search ..................... 182/187, 188; 43/1; 224/155, 158, 159, 160, 161

[56] References Cited

U.S. PATENT DOCUMENTS

| | | | |
|---|---|---|---|
| 1,302,927 | 5/1919 | Janczyk | 224/161 |
| 3,730,294 | 5/1973 | Thurmond | 224/155 |
| 3,817,350 | 6/1974 | Gray | 182/187 |
| 3,991,853 | 11/1976 | Bridges | 182/187 |
| 4,120,379 | 10/1978 | Carter | 182/187 |
| 4,475,627 | 10/1984 | Eastridge | 182/187 |
| 4,487,345 | 12/1984 | Pierce et al. | 224/155 |
| 4,552,246 | 11/1985 | Thomas | 182/187 |
| 4,595,079 | 6/1986 | Shope | 182/187 |
| 4,727,961 | 3/1988 | Dawson | 182/187 |

FOREIGN PATENT DOCUMENTS 102303 2/1983 Fed. Rep. of Germany ...... 182/187

Primary Examiner—Kurt Rowan
Attorney, Agent, or Firm—Leon Gilden

[57] ABSTRACT

A deer stand arrangement is presented wherein an interfoldable deer stand arrangement is of a compact organization to enable vertical positioning by use of a pulley arrangement with respect to a tree to enable ready securement of said deer stand to the tree. A pivotal seat framework has supportingly has secured thereto a water-proof fabric-like material wherein said fabric is releasably secured forwardly of the seat framework to enable said seat framework to interfold into the deer stand framework and said fabric thereafter may be overfolded of said deer stand framework to securedly position the various components therein.

4 Claims, 4 Drawing Sheets

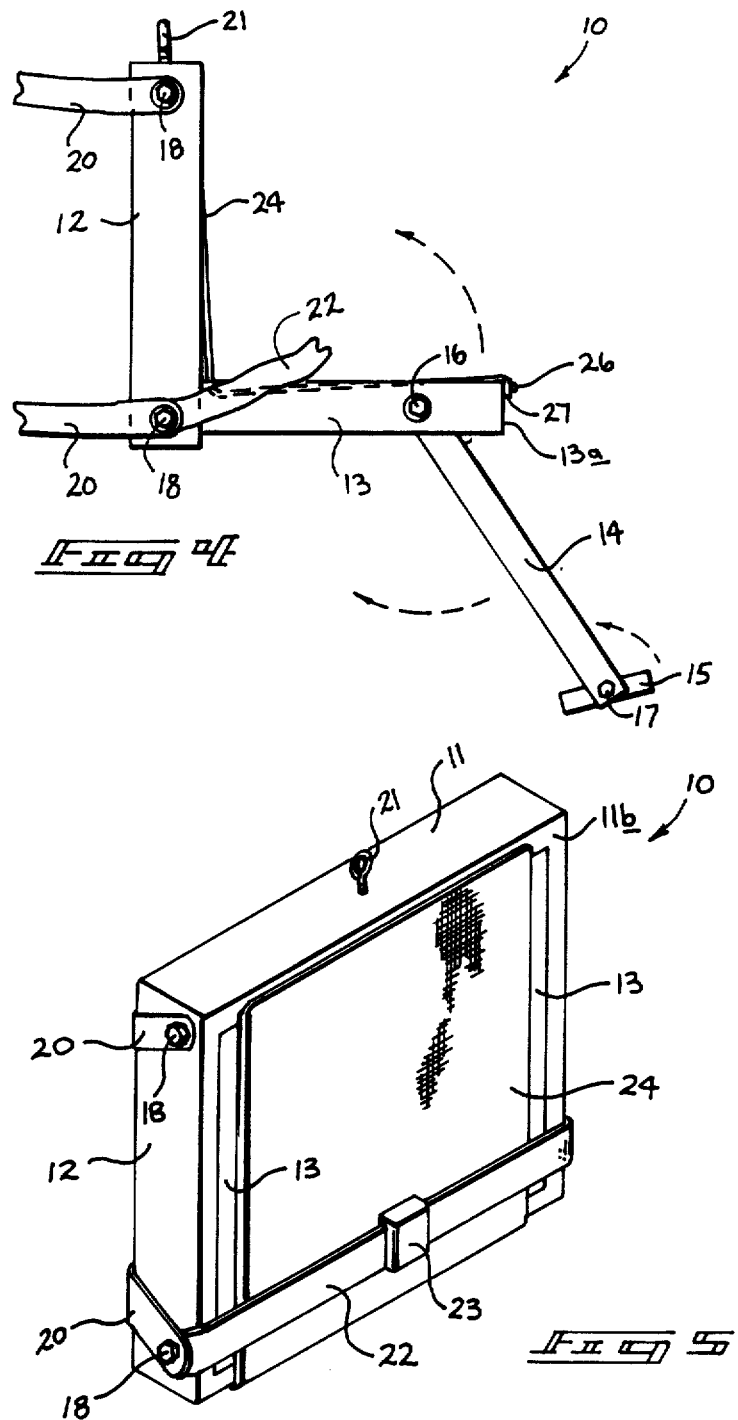

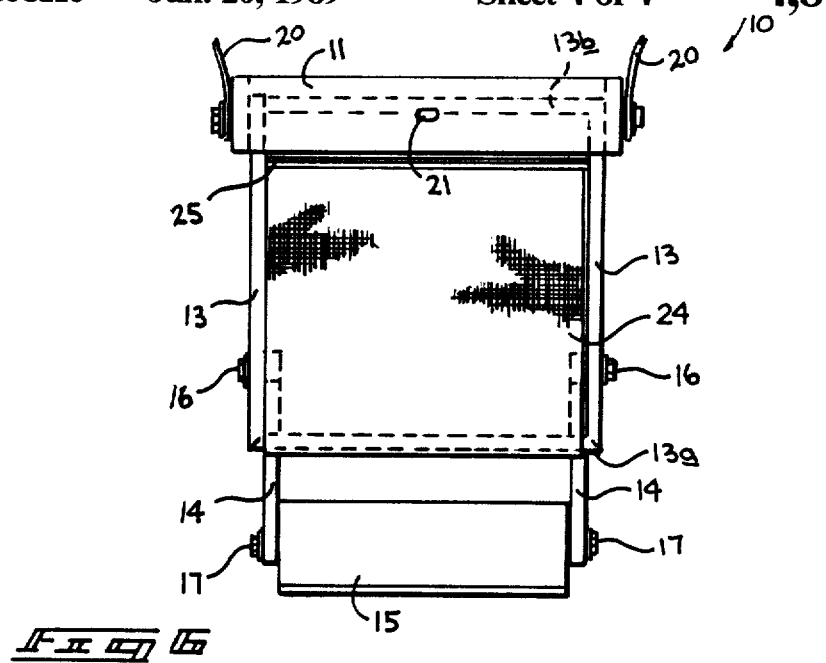
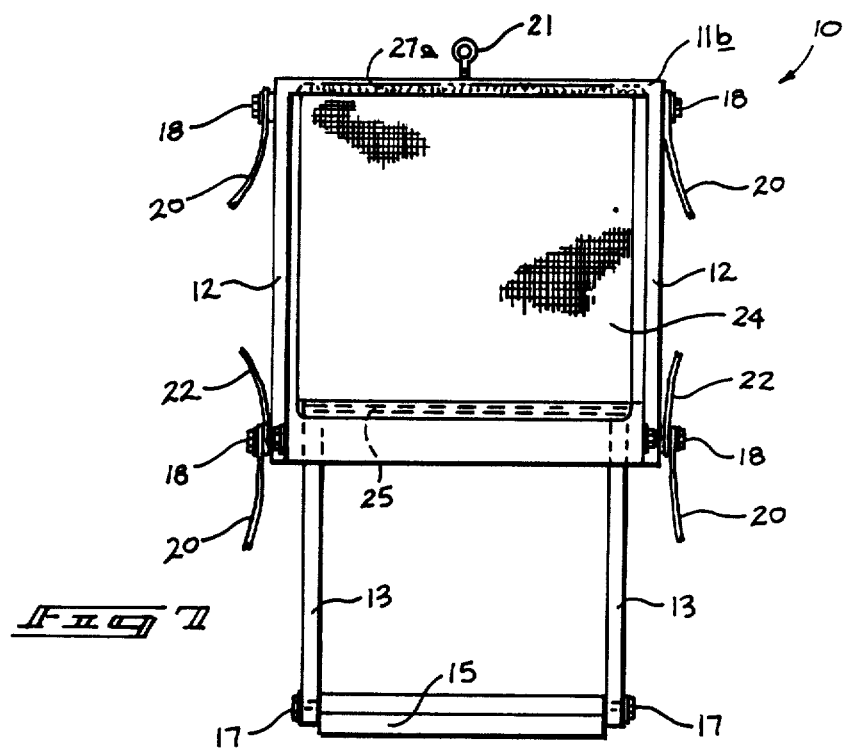

DEER STAND

BACKGROUND OF THE INVENTION

1. Field of the Invention

The present invention relates to portable deer stand, and more particularly pertains to a new and improved portable deer stand which when not being utilized may be interfolded to a compact size for transport or storage of same.

2. Description of the Prior Art

The use of portable housings and stands for use in hunting forums is well known in the prior art. As may be appreciated, these devices have normally required a substantial amount of space and as such, it is desirable to compactly store the devices for transport when they are not being utilized. In this connection, there have been several attempts to develop portable hunting structures which may be easily and efficiently stored when desired. For example, U.S. Pat. No. 2,854,705 to McClaren sets forth a portable hunting blind wherein the organization may be carried on the average car to and from a hunting site. The hunting blind of McClaren is of relatively expansive construction and requires substantial amounts of labor and time in the erection thereof.

U.S. Pat. No. 3,052,054 to Littleton, et al., sets forth equipment for performing the function of camouflaging the presence of a hunter. A series of light-weight inflatable units are securable along their contiguous edges for creation of the appearance of natural phenomena to provide concealment for hunters therebehind. The apparatus is to limited application for use as a deer stand and is of relatively inappropriate construction for use in elevated deer stand arrangements.

U.S. Pat. No. 3,690,334 to Miller sets forth an erectable opaque plastic housing formed with transparent windows and elongate members to be detachably secured together forming a framework which may be rolled up when not in use. The Miller organization is of a ground supported type and is accordingly ill suited for the purposes of the instant invention.

U.S. Pat. No. 3,848,352 to Sayles set forth a hunter's blind including a ground supported structure with a pivotal screen overlying the organization wherein a hunter seated within the organization may visually perceive objects exteriorly of the structure and reposition the pivotal overlying screen for access thereto.

U.S. Pat. No. 4,606,142 to Reneau sets forth a game blind formed with a plurality of telescoping sections wherein an upper section is elevated by a plurality of legs received in brackets. The organization is as other prior references of relatively cumbersome and complex organization relative to the instant invention to minimize its effectiveness and portability in hunting scenarios.

As such, it may be appreciated that there is continuing need for a new and improved deer stand wherein the problems of storage and portability are substantially solved and in this respect, the present invention substantially fulfills this need.

SUMMARY OF THE INVENTION

In view of the foregoing disadvantages inherent in the known types of deer stands now present in the prior art, the present invention provides an deer stand wherein the same may be compactly stored when not in use for transport thereof and may be further easily and efficiently positioned to an associated tree and unfolded for use. As such, the general purpose of the present invention, which will be described subsequently in greater detail, is to provide a new and improved deer stand which has all the advantages of the prior art deer stands and none of the disadvantages.

To attain this, the present invention comprises a deer stand which may be compactly folded within a deer stand perimeter framework during periods of non-use. Upon disengaging associated securement and a safety strap, the deer stand apparatus may be unfolded to present a seat and foot rest arrangement including a repositionable fabric-like material which performs a function of a seat in the unfolded relationship and is disengageable from a seat framework for enclosing in a secure manner the folded organization.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the great invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention of provide a new and improved deer stand which has all the advantages of the prior art deer stand and none of the disadvantages.

It is another object of the present invention to provide a new and improved deer stand which may be easily and efficiently manufactured and marketed.

It is a further object of the present invention to provide a new and improved deer stand which is of a durable and reliable construction.

An even further object of the present invention is to provide a new and improved deer stand which is susceptible of a low cost of manufacture with regard to both materials and labor, and which accordingly is then susceptible of low prices of sale to the consuming public, thereby making such deer stands economically available to the buying public.

Still yet another object of the present invention is to provide a new and improved deer stand which provides in the apparatuses and methods of the prior art some of the advantages thereof, while simultaneously overcoming some of the disadvantages normally associated therewith.

Still another object of the present invention is to provide a new and improved deer stand wherein the same may be compactly interfolded into a perimeter framework for transport thereof.

Yet another object of the present invention is to provide a new and improved deer stand wherein the deer stand may be readily vertically repositioned relative to a tree to enable securement thereto.

Even still another object of the present invention is to provide a new and improved deer stand wherein the deer stand may be readily unfolded for immediate use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic side view of the deer stand of the instant invention.

FIG. 5 is an isometric view of the deer stand of the instant invention in an interfolded orientation.

FIG. 6 is an orthographic top view of the deer stand of the instant invention in an unfolded orientation.

FIG. 7 is a rear orthographic view of the deer stand of the instant invention in an unfolded orientation.

DESCRIPTION OF THE PREFERRED EMBODIMENT

Figure 1:
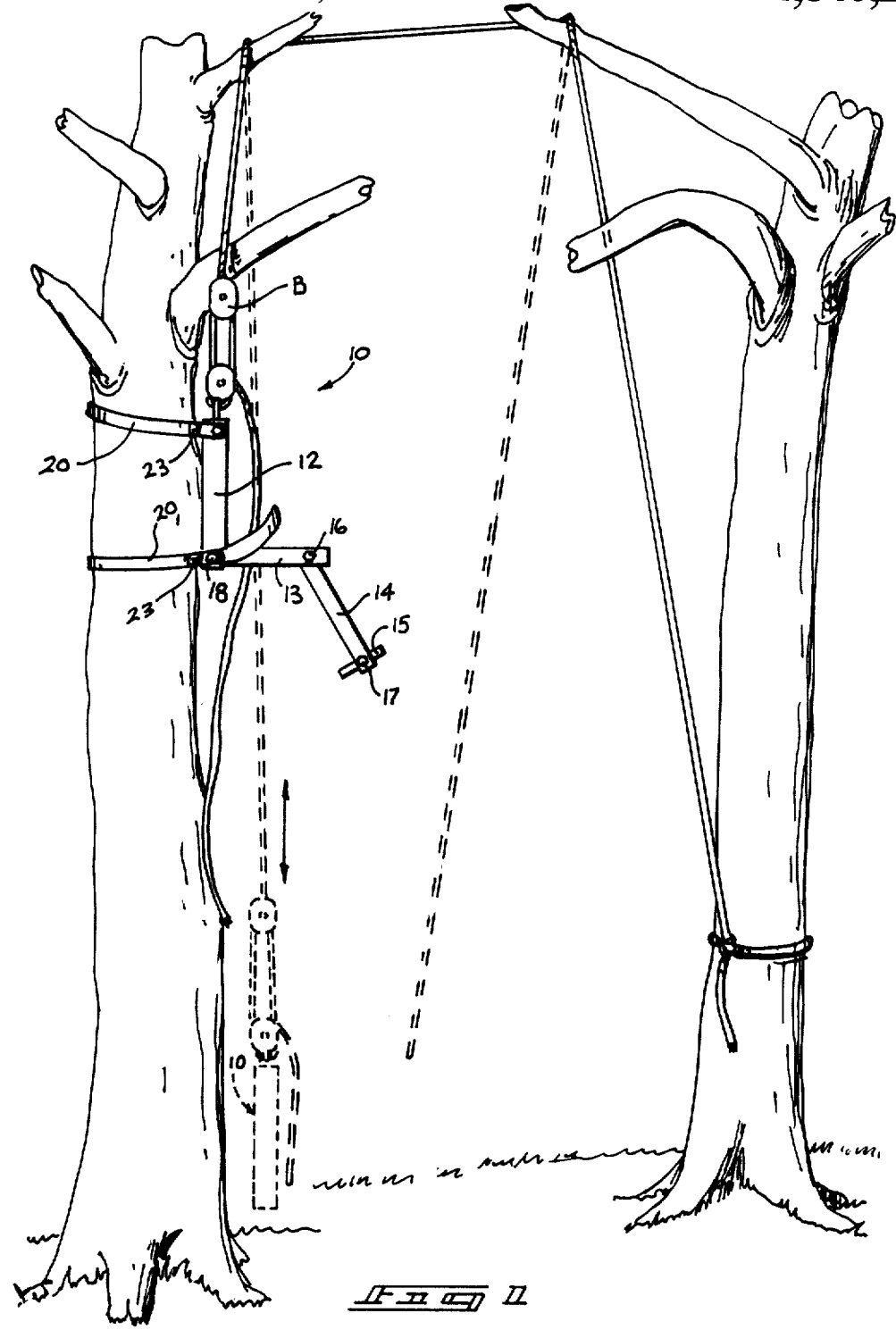
FIG. 1 is an isometric view of the instant invention illustrating the repositioning of the interfolded deer stand unit from a first position to a second position relative to an associated tree.
Figure 2:
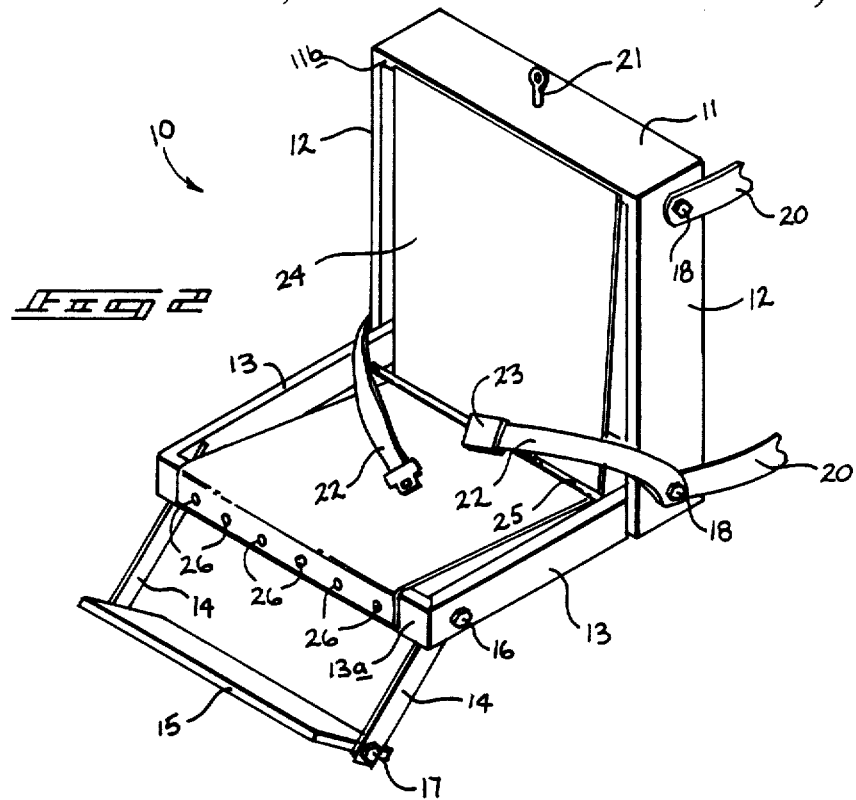
FIG. 2 is an isometric forward view of the deer stand of the instant invention in an unfolded orientation.
Figure 3:
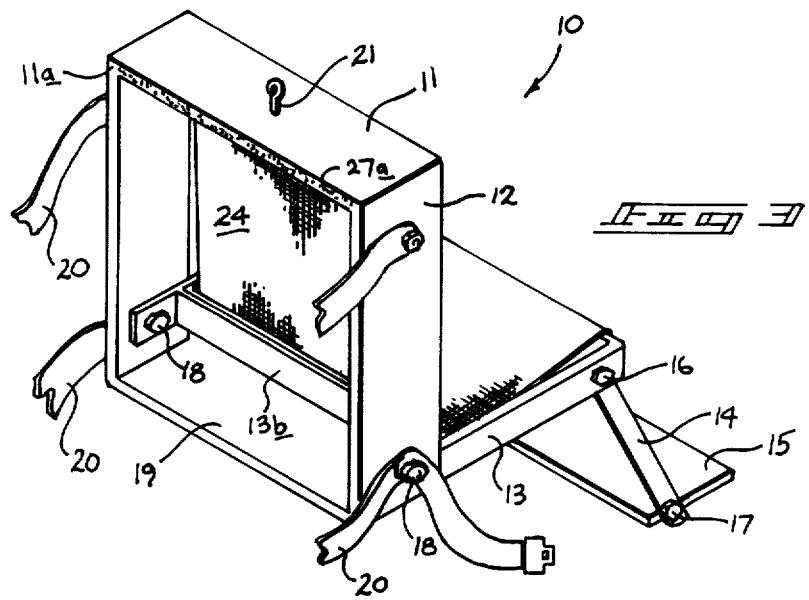
FIG. 3 is a rear isometric view of the deer stand of the instant invention in an unfolded orientation.

With reference now to the drawings, and in particular to FIGS. 1 to 7 thereof, a new and improved deer stand embodying the principles and concepts of the present invention and generally designated by the reference numeral 10 will be described.

More specifically, it will be noted that the deer stand apparatus 10 essentially comprises a framework formed with a top frame member 11, side frame members 12, and a bottom frame member 19. Right and left seat frame arms 13 are pivotally secured to the side frame member 12 by means of seat frame connectors 18. The seat frame arms 13 have formed thereto a seat frame link 13a securing the forward terminal ends of seat frame arms 13 together. A plurality of foot rest links 14 are pivotally secured to the seat frame arms 13 utilizing link connectors 16 at one end of the foot rest links 14 with a foot rest plate 15 pivotally secured to the foot rest links 14 at their other terminal end utilizing foot rest connectors 17. The seat frame connectors 18 further secure a lowermost tree strap 20 at a lower portion of the side 12 in association with a seat frame arms 13 and like connectors 18 secure a second set of tree straps 20 at an upper portion of the frame sides 12. Furthermore, a seat belt arrangement 22 is additionally secured to lowermost connectors 18 and is securable by means of a conventional buckle arrangement 23, as are the tree straps 20 in their securement about an associated tree.

A fabric 24, preferably formed of waterproof material, is secured to forward face 11b of top frame 11 at a terminal end thereof and is guided about an alignment rod 25 secured between the two side seat frame arms 13. The seat fabric 24 is secured removably to seat frame link 13a utilizing both Velcro(TM) and snap fasteners 26. A Velcro(TM) connection, as noted, is formed selectively between seat frame link 13a and the forward terminal end of seat fabric 24 and indicated as 27 in FIG. 4. The seat fabric 24 is secured, as indicated in FIG. 4, in an unfolded condition and upon pivoting of the various elements, as indicated in FIG. 4 in the direction indicated by the arrows, the forward terminal end of seat fabric 24 is removed from forward seat frame link 13a and thereafter wrapped about bottom frame member 19 of the deer stand framework and thereafter secured to rear face 11a of top frame member 11 to a companion Velcro(TM) or hook and loop fastener facing 27a to form the compact organization as illustrated in FIG. 5.

In use, the deer stand 10 may be transported to a desired location and thereafter by means of any suitable arrangement, such as a block and tackle with rope dog organization securable to hook 21, and, as illustrated in FIG. 1, the deer stand may thereafter be hoisted to a desired vertical orientation and thereafter secured about an associated tree by means of the tree straps 20 and associated buckles 23. Accordingly, a convenient and portable deer stand is availed of the above described organization.

The deer stand 10 has a further comfort in the use of the fabric material 24 and the rear seat frame link 13b provided not only rigidity to the seat frame organization but further provides a measure of torso support when a user is fully seated within the confines of the seat frame 13, members 13b and 13a. The foot rest 15 is pivotal at connection 16 and 17 to enable a user to adjust the angularity of seating of his lower limbs and further adds to the comfort and use of a device, as set forth by the instant invention, where prolonged sitting is a consequence of the hunting event.

Therefore, the manner of usage and operation of the present invention should be apparent from the above description and accordingly no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A deer stand apparatus for selective securement to trees and the like comprising:
   a housing framework including a top frame member, a bottom frame member, and a plurality of side frame members, and
   a seat framework including a plurality of arms pivotally secured to each of said side frame members with a forward seat link and a rearward seat link joining said arms together, and
   a foot rest means pivotally secured to said plurality of arms, said seat framework means and said foot rest means foldable within the housing framework at a first position and unfoldably disposable orthogonally to said housing framework in a second position, and
   wherein said seat framework means includes a seat fabric wherein said seat fabric is secured to a forward face of said top frame member at one terminal end and securable to said forward seat link at said other end, and
   wherein said seat fabric is releasably securable to said forward seat link by means of hook and loop fastening strips and additionally the use of snap fasteners, and
   wherein said other end of said fabric is securable to a rear face of said top frame member when said seat framework means and said foot rest means are foldably nested within the housing framework, and
   wherein a plurality of tree straps are secured to said side frame members for securement about an associated tree, and
   wherein a seat belt is secured to said side frame members, and
   wherein at least one of said tree straps and said seat belts are secured to said side frame member about a common connection additionally securing said arms to said side frame members.

2. A deer stand apparatus as set forth in claim 1 wherein a hook is secured to a top surface of said top frame member for attachment of lifting apparatus to lift said deer stand apparatus vertically relative to and associated tree.

3. A deer stand apparatus as set forth in claim 2 wherein an alignment rod is secured between said arms proximate said rear seat link for positioning said seat fabric between said alignment rod and said rear seat link.

4. A deer stand apparatus as set forth in claim 3 wherein said rear seat link is positioned forwardly of said connecting elements to provide rigidity to said seat framework and additionally provide torso support to a user of the deer stand apparatus.

* * * * *